United States Patent [19]

Maxfield et al.

[11] Patent Number: 5,514,734
[45] Date of Patent: May 7, 1996

[54] POLYMER NANOCOMPOSITES COMPRISING A POLYMER AND AN EXFOLIATED PARTICULATE MATERIAL DERIVATIZED WITH ORGANO SILANES, ORGANO TITANATES, AND ORGANO ZIRCONATES DISPERSED THEREIN AND PROCESS OF PREPARING SAME

[75] Inventors: MacRae Maxfield, Teaneck; Brian R. Christiani, Maplewood, both of N.J.; Vinod R. Sastri, Richmond, Va.

[73] Assignee: AlliedSignal Inc., Morris Township, Morris County, N.J.

[21] Appl. No.: 500,026

[22] Filed: Jul. 10, 1995

Related U.S. Application Data

[63] Continuation of Ser. No. 109,955, Aug. 23, 1993, abandoned.

[51] Int. Cl.$^6$ ........................................... C08K 9/02
[52] U.S. Cl. ........................ 523/204; 523/216; 524/445; 524/448; 524/449; 524/443; 524/442; 524/789
[58] Field of Search ................................. 524/445, 448, 524/449, 443, 442, 789; 523/216, 204

[56] References Cited

U.S. PATENT DOCUMENTS

| 2,531,396 | 3/1947 | Carter et al. . |
| 4,739,007 | 4/1988 | Okada et al. . |

FOREIGN PATENT DOCUMENTS

| 0099710 | 2/1984 | European Pat. Off. . |
| 0358415 | 3/1990 | European Pat. Off. . |
| 0398551 | 11/1990 | European Pat. Off. . |
| 3808623 | 3/1988 | Germany . |
| 103653 | 12/1973 | Japan . |
| 109998 | 9/1976 | Japan . |
| 38865 | 3/1980 | Japan . |
| 215557 | 9/1991 | Japan . |
| 215556 | 9/1991 | Japan . |
| 59817 | 4/1993 | Japan . |
| 9311190 | 6/1993 | WIPO . |
| 9411430 | 5/1994 | WIPO . |

OTHER PUBLICATIONS

*Synthesis and Properties of Polyimide–Clay Hybrid*, Polymer Preprints 52, No. 1, Apr. 1991, pp. 65–66.
*Synthesis and Characterisation of a Hylon 6–Clay Hybrid*, Polymer Preprints, 28, pp. 447–448.

Primary Examiner—Melvyn I. Marquis
Attorney, Agent, or Firm—Michele G. Mangini

[57] ABSTRACT

This invention relates to a process of forming a composite material comprising a polymer matrix comprising a polymeric material and dispersed particles selected from the group consisting of platelet or fibrillar particles having average thicknesses of less than 50$^\wedge$ and a maximum thickness of less than about 100$^\wedge$ and fibrils having an average diameter equal to or less than about 200$^\wedge$ and a maximum diameter of about 200$^\wedge$ and having an organo metallic residue species covalently to said particles organo metallic species having a moiety which is compatible with a polymer species in the polymer matrix, or said species having a moiety which is covalently bonded to a polymer species in the polymer matrix or a combination thereof, said dispersed particles being present in an amount less than about 60% by weight of the composite material and to the composite material formed by such process

31 Claims, No Drawings

5,514,734

POLYMER NANOCOMPOSITES COMPRISING A POLYMER AND AN EXFOLIATED PARTICULATE MATERIAL DERIVATIZED WITH ORGANO SILANES, ORGANO TITANATES, AND ORGANO ZIRCONATES DISPERSED THEREIN AND PROCESS OF PREPARING SAME

This application is a continuation of application Ser. No. 08/109,955 Filed Aug. 23, 1993, abandoned.

BACKGROUND OF INVENTION

1. Field of the Invention

This invention relates to a composite material comprising a polymer matrix having dispersed therein platelet particles derived from swellable intercalated layered or fibril particles derivatized with reactive organo silane, titanate and zirconate compounds, and to articles of manufacture formed from the composite of this invention. This invention also relates to a process of forming the composite of this invention where the intercalated layered or fibril particles have layers or fibrils which are compatible with the polymer of the matrix, such that during the process the polymer-compatible layers of the intercalated material dissociate one from the other to form platelet or fibril fillers.

2. Prior Art

A specific category of polymer composites has been described as a composite material comprising a polymer matrix containing a polyamide having uniformly dispersed therein layers of silicate. Such composites and process for forming same are described in U.S. Pat. Nos. 4,889,885; 5,091,462; 4,136,103; 5,102,948; 2,886,550; 4,739,007 and 4,810,734; Deutsches Pat. 3808623 A 1; Japanese Patent J 02 208358 A; EPO 0 351 357; 0 358 415; 4 459 472; 0 387 903; 0 352 042 and 0 398 551; Japanese Kokai Nos. 76/109,998; 53/69297; 49-20249; 50-27851; 215557; 215556; 51/109998; 48/103653; 55/38865 and 59817; *J. Inclusion Phenomena* 5, (1987), 473–483; *Clay Minerals,* 23, (1988),27; *Polym. Preprints,* 32, (April 1991), 65–66; and *Polym. Prints,* 28, (August 1987), 447–448.

U.S. Pat. No. 4,874,728 discloses organophilic clay comprising a smectite clay, a quaternary ammonium compound having at least one long (12 to 22 carbon) alkyl chain, and an organosilane.

U.S. Pat. No. 2,531,396 discloses elastomer base and a clay modified with an organic onium base and (2) a compounding process consisting of mixing a suspension of modified clay with a rubber latex in the presence of a precipitating agent, and collecting the precipitated. coagulate.

Treatment of mineral fillers with molecular agents, such as silanes, is known. See for example E. P. Plueddemann, "Silane Coupling Agents", Plenum, New York, 1982.

SUMMARY OF THE INVENTION

This invention relates to a process for forming a polymeric composite which comprises layered or fibrillar particles dispersed in a polymeric matrix which comprises the steps of:

(a) derivatizing an inorganic material comprising layered or fibrillar particles by reaction with an organo metallic species selected from the group consisting of organo silanes, organo titanates and organo zirconates, said species having one or more moieties which are capable of forming covalent bonds with said particles and said species having one or more moieties which are reactive with a polymer precursor or said species having one or more moieties which are compatible with a polymer formed by polymerization of said polymer precursor or a combination of said species to form a swellable and polymer compatible intercalated material having a first residue of said organo metallic species covalently bonded to all or a portion of said particles; and (b) polymerizing said polymer precursor in the presence of said swellable and polymer compatible intercalated material to form a composite having said particles uniformly dispersed in a polymeric matrix comprising said polymer, wherein the interlayer or interfibril distances is equal to or greater than about 50 A, the average thickness of said platelet particles is equal to or less than about 50 A where the maximum thickness is equal to or less than about 100 A and the average diameter or "equivalent diameter" of said fibrils is equal to or less than about 100 A where the maximum diameter or "equivalent diameter" is equal to or less than about 200 A, wherein the length to diameter ratio of said fibril is equal to or greater than about 10 to about 1, said particles having organo metallic species bonded thereto said bonded species having one or more moieties bonded to at least one polymer in said polymer matrix, or said species having one or more moieties which are compatible with at least one polymer in said polymer matrix which project away from the particle surface and which are not bonded to said polymer or a combination of said species.

Another aspect of this invention relates to a process of for forming a polymeric composite which comprises layered or fibrillar particles dispersed in a polymeric matrix which comprises the steps of::

(a) forming a reaction mixture comprising a polymer precursor and a swellable and polymer compatible intercalated material comprising layered or fibrillar particles having an organo metallic species selected from the group consisting of organo silanes, organo titanates and organo zirconates covalently bonded to said particles, said species having one or more moieties which are reactive with said polymer precursor or said species having one or more moieties which are compatible with a polymer formed by polymerization of said polymer precursor or a combination of said species said species being reactive with said polymer precursor; and (b) polymerizing said polymer precursor in the presence of said swellable and polymer compatible interelated material to form a composite having said particles uniformly dispersed in a polymeric matrix comprising said polymer, wherein the interlayer or interfibril distances is equal to or greater than about 50 A, the average thickness of said platelet particles is equal to or less than about 50 A where the maximum thickness is equal to or less than about 100 A and the average diameter or "equivalent diameter" of said fibrils is equal to or less than about 100 A where the maximum diameter or "equivalent diameter" is equal to or less than about 200 ■, wherein the length to diameter ratio of said fibril is equal to or greater than about 10 to about 1, said particles having organo metallic species bonded thereto said bonded species having one or more moieties bonded to at least one polymer in said polymer matrix, or said species having one or more moieties which are compatible with at least one polymer in said polymer matrix which project away from the particle surface and which are not bonded to said polymer or a combination of said species.

Yet another aspect of this invention relates to a process of for forming a polymeric composite which comprises layered or fibrillar particles dispersed in a polymeric matrix which comprises the steps of::

(a) forming a reaction mixture comprising a polymer precursor, a swellable layered or fibrillar particles and an organo metallic species selected from the group consisting of organo silanes, organo titanates and organo zirconates, said species having one or more moieties which are capable of forming covalent bonds with said particles and said species having one or more moieties which are reactive with a polymer precursor or said species having one or more moieties which are compatible with a polymer formed by polymerization of said polymer precursor or a combination of said species to form a swellable and polymer compatible intercalated material having a first residue of said organo metallic species covalently bonded to said particles; and (b) polymerizing said polymer precursor in said mixture to form a composite having said particles uniformly dispersed in a polymeric matrix comprising said polymer, wherein the interlayer or interfibril distances is equal to or greater than about 50 A, the average thickness of said platelet particles is equal to or less than about 50 A where the maximum thickness is equal to or less than about 100 A and the average diameter or "equivalent diameter" of said fibrils is equal to or less than about 100 A where the maximum diameter or "equivalent diameter" is equal to or less than about 200 A, wherein the length to diameter ratio of said fibril is equal to or greater than about 10 to about 1, said particles having organo metallic species bonded thereto said bonded species having one or more moieties bonded to at least one polymer in said polymer matrix, or said species having one or more moieties which are compatible with at least one polymer in said polymer matrix which project away from the particle surface and which are not bonded to said polymer or a combination of said species.

Still another aspect of this invention relates to a composite material comprising a polymer matrix comprising a polymer, said matrix having layered or fibrillar particles uniformly dispersed therein, wherein the interlayer or interfibril distances is equal to or greater than about 50 A, the average thickness of said platelet particles is equal to or less than about 50 A where the maximum thickness is equal to or less than about 100 A and the average diameter or "equivalent diameter" of said fibrils is equal to or less than about 100 A where the maximum diameter or "equivalent diameter" is equal to or less than about 200 A, wherein the length to diameter ratio of said fibril is equal to or greater than about 10 to about 1, said particles having organo metallic species bonded thereto, said bonded species having one or more moieties bonded to at least one polymer in said polymer matrix, or said species having one or more moieties which are compatible with at least one polymer in said polymer matrix which project away from the particle surface and which are not bonded to said polymer or a combination of said species.

Still another aspect of this invention relates to an article of manufacture comprising a body which is formed totally or in part from the composite of this invention.

The polymeric compositions of this invention exhibit one or more advantages over prior art composites as for example those described in U.S. Pat. Nos. 4,739,007; 2,531,396 and 4,410,734; Deutsches Pat. 3,808,623 A1; Japanese Patent No. 02 208358A and EPA 0,398,551; 0,358,415; 0,352,042 and 0,398,551. For example, the composite of this invention exhibits improved properties such as yield strength and stiffness when dry and when in the presence of polar solvents such as water, methanol, ethanol and the like. Other advantages include enhanced heat resistance, enhanced toughness and enhanced impact strength. The composites of this invention also exhibit superior resistance to diffusion of polar liquids and of gases in the presence of polar media. The material complexes of organo silanes, organo titanates and/or organo zirconates, and organo silanes, organo titanates and/or organo zirconates mixed with primary or secondary ammonium cations have the advantage of having prolonged thermal stability at temperatures greater than about 300° C., below which most thermoplastics are polymerized. The polymer composites formed with organo silanes, organo titanates and/or organo zirconates and organo silanes, organo titanates and/or organo zirconates mixed with one or more onium compounds such as primary or secondary ammonium cations have the advantages of enhanced barrier properties, stiffness, and yield strength when exposed to polar media, enhanced toughness, enhanced stiffness, and enhanced yield strength at elevated temperatures.

DESCRIPTION OF THE PREFERRED EMBODIMENTS OF THE INVENTION

The process of this invention includes two essential steps which may be carried out sequentially or concurrently. The first step of the process comprises forming a swellable layered or fibrillar material which is polymer compatible or polymer compatible and reactive, and the second step comprises polymerizing a polymer precursor in the presence of the layered or fibrillar material formed in the first step.

The first step of the process of this invention comprises derivatizing a "swellable layered or fibrillar material" by intercalation of said swellable layered or fibrillar material with an organo metallic material selected from the group consisting of organo silanes, organo titanates and organo zirconates and reaction of said organo metallic and said swellable layered or fibrillar material to form a "swellable and polymer-compatible intercalated layered or fibrillar material or polymer-compatible and reactive intercalated layered or fibrillar material". As used herein, "swellable layered or fibrillar materials" are materials comprising planar layers or fibrils arrayed in a coherent, coplanar or aligned structure, where the bonding within the layered or fibrillar particles is stronger than the bonding between the layered or fibrillar particles and where a neutral or ionic intercalant or intercalants are arrayed between the layers or fibrils, such that the materials exhibit increased interlayer or interfibril spacing in their intercalation compounds; and a "swellable and polymer-compatible intercalated layered material or fibrillar material or polymer-compatible and reactive intercalated layered material or fibrillar material" is a swellable layered material or fibrillar material where spaces between layered particles or fibrillar particles have been intercalated by one or more intercalants comprising one or more organo metallic material selected from the group consisting of organo silanes, organo titanates, organo zirconates or a combination thereof an where said organo metallic material has reacted with said layered particles or said fibrillar particles. As used herein, "layered particles" are particles having two relatively flat opposite faces wherein the thickness of which is the distance between the faces, which is relatively small compared to the size of the faces and as used herein "fibrillar particles" are rod shaped or substantially rod shaped substantially particles having a length dimension greater than the width dimension and having a regular or irregular cross-section.

The intercalants may be introduced into the spaces between every layer or fibril, nearly every layer or fibril, or a large fraction (greater than about 75%) of the layers of fibrils of the layered material such that upon swelling and exfoliation of the swellable material, the resulting platelet particles comprise less than about 10 layers in thickness or fibrillar particles of less than about 10 fibrils in diameter. The platelet particles are preferably less than about 8 layers in thickness and fibrillar particles are preferably less than about 8 fibrils in diameter, more preferably platelet particles are less than about 5 layers in thickness and fibrillar particles are more preferably less about 5 fibrils in diameter, and most preferably platelet particles are about 1 or 2 layers in thickness and fibrillar particles are about 1 or 2 fibrils in diameter.

The amount of organo silane, organo titanate and/or organo zirconate swelling agent/compatibilizing agent intercalated, alone or in combination optional intercalants as for example onium intercalants, into swellable layered or fibrillar materials and reacted therewith may vary substantially provided that the amount is effective to swell and to compatibilize the layers of the intercalated layered or fibrillar material to the extent required to provide the desired substantially uniform dispersion of the material in the polymeric matrix. In the preferred embodiments of the invention, amounts of organo silane, organo titanate and/or organo zirconate agents employed will be equal to or greater than about 1 m moles/100 g of layered or fibrillar material. In the more preferred embodiments of the invention the amount of the agent will range from about 2 mmole/100 g of layered material or fibrillar material to about 200 mmole/100 g of layered or fibrillar material. Most preferred amounts of organo silane, organo titanate and/or organo zirconate agents are from about 20 mmole/100 g to about 120 mmole/100 g. In the case of the preferred layered smectite clay minerals, the most preferred amounts of organo silane, organo titanate and/or organo zirconate agents are from about 20 mmole/100 g to about 100 mmole/100 g of layered material.

Swellable and polymer-compatible intercalated layered or fibrillar material can be formed by any method suitable for forming organo clays. The organo silane, organo titanate and/or organo zirconate swelling/compatibilizing agents may be introduced into the interlayer spaces of the swellable layered material by any suitable method as, for example, by insertion of neutral molecules using conventional procedures. Insertion of neutral molecules may be performed by exposing finely divided layered material to intercalants in the form of a gas, neat liquid, finely divided solid, or solute in a solvent which, preferably swells the layered or fibrillar material. Insertion is generally aided by exposure of the mixture of intercalant and layered or fibrillar material to heat, ultrasonic cavitation or microwaves. (See for example G. Lagly et. al., American Mineralogist, Vol 60, pp. 642–649 (1975) For example, montmorillonite or a saponite in water, may be heated as for example, to about 80° C. and stirred using a high speed mixer, in a concentration low enough to yield a low viscosity dispersion from which non-dispersible particles can be separated by sedimentation (mineral concentration of about 2% by weight, or 5% to 15% with addition of a peptizing agent such as sodium hexametaphosphate). The dispersion is combined with a solution of a reactive organo silane, organo titanate or organo zirconate such as a caprolactam blocked isocyanatopropyl, (triethoxy) silane and 1-trimethoxysilyl-2-(m,p-dichloromethyl) phenylethane such that the ratio of organo silane, organo titanate and/or organo zirconate to clay mineral is between 1 and 110 mmole per 100 g of clay.

For example, an alkoxy or acyloxy silanes, titanate or zirconate, dissolved in water or a mixture of water and a polar organic solvent such as methanol, ethanol, propanol, acetone, methyl ethyl ketone and the like, may be combined with a dispersion of layered or fibrillar material in a like solution at about 50° C. to about 90° C. The reactive organo silane, organo titanate and/or organo zirconate intercalated layered or fibrillar material resulting from this combination may be collected by filtration dried and ground into powder. Other organo silanes, organo titanates and/or organo zirconates (reactive or non-reactive) and onium cation may be combined in the same solution, or may be added in separate steps to the dispersion of layered material. Alternatively, layered or fibrillar material may be intercalated wholly or in part by reactive silane swelling/compatibilizing agent by treating a swellable layered material already intercalated with an onium cation with the reactive organo silanes, organo titanates and/or organo zirconates. The reactive organo silanes, organo titanates and/or organo zirconates compound is preferably exposed to swellable intercalated material in a swelling liquid, such as ethanol, methanol, toluene, hexane, dioxane, glyme, diglyme, dimethylsulfoxide, methylethylketone, and the like, or by treating an aqueous suspension of a layered or fibrillar material with water-soluble reactive organo silane swelling/compatibilizing agents such as trialkoxysilanes. In one preferred embodiment, silane intercalated swellable, polymer compatible intercalated layered or fibrillar material is formed by the following procedure. Onium-intercalated layered materials are suspended and swollen in a swelling organic liquid, such as toluene, propanol, dioxane, glyme, diglyme, dimethylsulfoxide, methylethylketone, and the like, and treated with a trialkoxysilane. For example, montmorillonite intercalated with octadecylammonium cation, at about 80 mmole of ammonium cation/100 g mineral, is combined with dioxane to form a 5% by weight suspension which is heated to 60° C. and combined with a dioxane solution of aminoethylaminopropyl trimethoxysilane, such that the ratio of silane to mineral is about 20 mmole/100 g. The layers totally or partially intercalated with the reactive silane swelling/compatibilizing agent may be separated from the solution by some suitable method such as filtration or centrifugation, followed by rinsing in fresh water, rough drying, and ball milling to about 100 mesh powder. The powder may be rigorously dried at 60° C. to 160° C. in vacuum for 8 to 24 hrs, to provide the desired swellable/polymer compatible intercalated layered material.

The onium ion intercalated precursor particles may be formed by ion exchange by ionic molecules by suspending the layered material in a relatively volatile liquid which is capable of both exfoliating and dispersing the layers or fibrils of the and dissolving a salt of the ionic intercalant as well as the resulting salt of the ion displaced from the layered material (e.g., $Na^+$, $Mg^{+2}$, $Ca^{+2}$), adding the salt of the ionic intercalant, and removing the layered material (now completed with the new intercalant) from the liquid (now containing the dissolved salt of the displaced ion). For example, swellable layered minerals such as montmorillonite and hectorite (having primarily $Na^+$ cations in the interlayer spaces) intercalate water to the point that the layers are exfoliated and dispersed uniformly in water. Dispersion in water is generally aided by mixing with relatively high shear. An onium material such as the hydrochloride salt of dodecylamine is then added in the desired amount after which the layers completed with the ammonium cation are separated from the dispersion, washed of residual NaCl, and dried.

Any swellable layered or fibril material having the above referenced characteristics may be used in the practice of this invention. Illustrative of useful fibrillar inorganic materials are imogolite, vanadium oxide, carbon tubules and the like.

Useful swellable layered materials include phyllosilicates. Illustrative of such materials are smectite clay minerals such as montmorillonite, nontronite, beidellite, volkonskoite, hectorite, saponite, sauconite, magadiite, and kenyaite; vermiculite; and the like. Other useful layered materials include illite minerals such as ledikite and admixtures of illites with the clay minerals named above. Other useful layered materials, particularly useful with anionic polymers, are the layered double hydroxides, such as $Mg_6Al_{3.4}(OH)_{18.8}(CO_3)_{1.7}$—$H_2O$ (see W. T. Reichle, J. Catal., 94 (12985) 547), which have positively charged layers and exchangeable anions in the interlayer spaces. Other layered materials having little or no charge on the layers may be useful in this invention provided they can be intercalated with swelling agents which expand their interlayer spacing. Such materials include chlorides such as $ReCl_3$ and $FeOCl$, chalcogenides such as $TiS_2$, $MoS_2$, and $MoS_3$, cyanides such as $Ni(CN)_2$, and oxides such as $H_2Si_2O_5$, $V_6O_{13}$, $HTiNbO_5$, $Cr_{0.5}V_{0.5}S_2$, $W_{0.2}V_{2.8}O_7$, $Cr_3O_8$, $MoO_3(OH)_2$, $VOPO_4$—$2H_2O$, $CaPO_4CH_3$—$H_2O$, $MnHAsO_4$—$H_2O$, $Ag_6Mo_{10}O_{33}$, and the like.

Preferred swellable materials are layered materials having charges on the layers and exchangeable ions such as sodium cations, quaternary ammonium cations, calcium cations and the like between the layers which can be intercalated by useful reactive organo silanes, organo titanates and/or organo zirconates by an insertion mechanism and covalent bond formation between the organo metallic compound and the surfactants and/or edges of the layers. More preferred layered materials are those having negative charges or basic sites on the layers, preferably at least about 20 basic sites per 100 g of material, more preferably at least about 50 basic sites per 100 g of material and most preferably from about 50 to about 120 basic sites per 100 g of material. Most preferred swellable layered materials are phyllosilicates having a negative charge on the layers ranging from about 0.2 to about 0.9 charges per formula unit and a commensurate number of exchangeable cations in the interlayer spaces. Particularly preferred layered materials are smectite clay minerals such as montmorillonite, nontronite, beidellite, volkonskoite, hectorite, saponite, sauconite, magadiite, and kenyaite, with hectorite and montmorilonite having from about 20 basic sites to about 150 basic sites per 100 g material being the layered material of choice.

The interlayer spacing of the swellable/compatibilized layered or fibrillar material is critical and exfoliation must be sufficient large to allow for the desired dispersion of the layers or fibrils during the process. As used herein, the "inter-particle spacing" refers to the distance between the faces of the layers of a layered material or between the surfaces of adjacent fibrils in a fibrillar material as they are assembled in the intercalated material before any delamination (or exfoliation) of layers or fibrils takes place. In general, the interparticle distance should be greater than about 4 Å, as determined by x-ray diffraction, in order to facilitate delamination of the layered material or fibrillar materials at the nanoscale. In the preferred embodiments of the invention, the interparticle distance is at least about 8 Å and more preferred interparticle distances are at least about 15 Å.

The organo silanes, organo titanates or organo zirconates are critical and are selected from the group consisting of organo silanes, organo titanates and organo titanates which have one or more moieties that are reactive with the layers of the layered material or the fibrils fibrillar material to form covalent bonds therewith (i.e. Si—O, Ti—O or Zr—O), and which have one or more moieties which are reactive with one or more polymer precursor or with the polymer formed from the polymer precursor or a combination thereof to form covalent bonds therewith, which have one or more moieties which are compatible with said polymer of a combination of such moieties. These organo metallic compounds function to weaken the interlayer or interfibril cohesive energy by swelling the interlayer or interfibril distances and increase the compatibility of the layers or fibrils with the polymer or by reacting with the polymer precursor. As used herein "compatible" refers to the extent to which the polymer matrix and the surface coating on the layers or fibrils (the compatibilizing agent) have a favorable interaction which promotes the intermingling of the matrix polymer and the surface layer in the interphase region. Compatibility derives from one or more of the following criteria: similar cohesive energy densities for the polymer and the derivatized platelets, similar or complimentary capacities for dispersive, polar, or hydrogen bonding interactions, or other specific interactions, such as acid/base or Lewis-acid/Lewis-base interactions. The compatibility of the polymer and the compatibilized layers and fibrils can be determined by dividing the Hildebrand Parameter of the liquid into separate contributions from dispersion ($\delta_d$), from polar interactions ($\delta_p$), and from hydrogen bonding interactions ($\delta_h$). In this scheme (which is disclosed in "Handbook of Solubility Parameters and Other Cohesive Parameters", by Allan F. M. Barton (CRC Press, 1983) pp. 141–162, 94–110) the Hildebrand Parameter is related to the contribution from dispersion ($\delta_d$), polar interactions ($\delta_p$) and hydrogen bonding ($\delta_h$) ("Hansen Parameters") by the relationship.

$$\delta^2 = \delta^2_d + \delta^2_p + \delta^2_h$$

In general, the solubility parameter of the compatibility layers and fibrils polymer should be within 10 $(MPa)^{1/2}$ of the solubility parameter of the compatibilized layers and fibrils. The difference in solubility parameters is preferably 1.0 $(MPa)^{1/2}$ and more preferably 0.5 $(MPa)^{1/2}$. Compatibilization will lead to an improved dispersion of the layers or fibrils particles in the matrix and an improved percentage of delaminated platelets with a thickness of less than 50 Å.

Organo metallic species which are reactive with the polymer precursor in the mixture and/or with the resulting polymer, the agent bond the layers or fibrils to the polymer by forming a covalent bonds with both the layers and the polymer. These reactive species facilitate delamination by polymer compatibility and covalent bonds with at least one polymer in the polymer matrix which are formed by reaction between the species and the polymer precursor of the polymer. Reactive organo metallics include hydrocarbons, fluorinated hydrocarbons, polysiloxanes substituted with hydrocarbons or fluorinated hydrocarbons that possess one or more functional groups that reacts with a particular polymer at temperatures equal to or less than the polymer's polymerization or melt processing temperature. For a more complete treatment of useful coupling agents, see "Silane Coupling Agents", E. P. Plueddemann, Plenum Press, NY, 1982; Modern Plastics Encyclopedia, October, 1976, Vol. 53, No. 12A, pages 161 and 166, "Titanate Coupling Agents", S. J. Monte. Continues through 1984; and Modern Plast. Encyclopedia, Vo. 60, No. 10A, pp 119, 1983–1984, "Titanate Coupling Agents", S. J. Monte and G. Sugerman).

Specific organo silanes, titanates or zirconates having reactive substituents can be selected for particular classes of matrix polymers. For example, useful combinations of reactive silane, titanate or zirconate substituents and polymers are: aminoalkyl substituent with polyamides, polyesters, and polycarbonates; chloromethylaromatic substituent with polyamides, polyamide-imides, and polyphenylenesulfide; isocyanatoalkyl substituent with polyesters; and caprolactam-blocked isocyanatoalkyl substituent with polyamides.

The organo silane, organo titanate or organo zirconate swelling/compatibilizing agents also preferably include a moiety or moieties whose cohesive energies are sufficiently similar to that of the polymer that of the layers or fibrils is made more compatible with at least one polymer in the matrix, thereby enhancing the homogeneity of the dispersion in the polymeric matrix or a moiety or moieties which react with a polymer precursor or a polymer in the polymer matrix to form covalent bonds the between the agent and a polymer in the matrix during polymerization step such that material, which are covalently bonded to the layered or fibrillar the organo silane, organo titanate or organo zirconate swelling/compatibilizing agent, becomes covalently bonded to the polymer. Non-reactive silane, titanate and zirconate substituents include hydrocarbons, fluorinated hydrocarbons, polysiloxanes substituted with hydrocarbons or fluorinated hydrocarbons These substituents are non-reactive with virtually all matrix polymers. Examples of non-reactive silane, titanate and zirconate substutuents are: alkyl, aryl, alkenyl, cycloalkyl, cycloalkenyl either unsubstituted or substituted with alkoxy, alkylthio, alkylcarbonyl, alkenyl, cyano, nitro. Non-reactive silane, titanate and zirconate substitutents also include functionalized hydrocarbons or fluorinated hydrocarbons, and polysiloxanes substituted with hydrocarbons or fluorinated hydrocarbons in all matrix polymers except those where the functional group reacts with the polymer at temperatures equal to or less than the processing temperature.

Intercalated layered or fibrillar materials are preferably derivatized by treatment of a suitable layered or fibrillar material with organo metallic species of the formula:

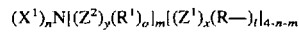

which react with the fibrils or layers to form species of the formula:

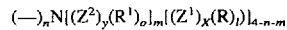

bonded to said fibrils or layers, where:

$X^1$ is a leaving group which is displaceable by or reactive with oxide functions on said layers or said layers such as phosphato, pyrophosphato, halo, alkoxy, acyloxy, amine and the like;

(—) is a covalent bond to the surface of the layer or fibril; N is Si, Zr or Ti;

$Z^1$ and $Z^2$ are the same or different and are —O—, —OC(O)—, —OC(O)O—, —OP(O)(O—)$_2$, —OP(O)(O-H)P(O)(O—)$_2$ or, —OS(O)$_2$—, or any two $Z^1$ or $Z^2$ or any $Z^1$ and $Z^2$ together may form a divalent chain forming cyclic structure such as cyclopyrophosphite;

l and o are the same or different and are 1 or 2;

x and y are the same or different and are 0 or 1 with the proviso that when N is Si, x and y are 0 and when N is Ti or Zr, x and y are 1;

m and n are the same or different and are is 1, 2 or 3, with the proviso that the sum of m and n is equal to 3;

$R^1$ are the same or different at each occurrence and are a nonhydrolyzable organic radicals which are bonded to the Si atom and not displaceable during the formation of the composite; and R are the same or different at each occurrence and are organic radicals which are bonded to the N atom, and which are not hydrolyzable and displaceable during the formation of the composite, and which is reactive with the polymer matrix or at least one polymeric component of the polymer matrix or with the polymer precursor to form covalent bonds between the reaction residue of R and the polymer or polymer precursor, preferably with the proviso that at least of R or $R^1$ is compatible with such matrix.

Illustrative of such organo metallic agents are N-(2-aminoethyl-3-aminopropyl trimethoxysilane,-3-isocyanatopropyltriethoxysilane, diethylphosphatoethyltriethoxysilane, trimethoxysilylpropylisothiouronium-chloride, N-(3-trimethoxysilypropyl)-N-methyl-N,N-diallylammonium-chloride N-(3-acyloxy-2-hydroxypropyl)-3-aminopropyl triethoxysilane, N-(triethoxysilylpropyl)urea, 3-amino propylmethyl diethoxysilane, 1-trimethoxysilyl-2-(p,m-chloromethyl)-phenylethane, (aminoethylaminomethyl)phenyl-ethyltrimethoxysilane, trimethoxysilylpropyldiethylenetriamine, vinyltriethoxysilane, vinyltris(t-butylperoxy)silane, 3-(n-styrylmethyl-2-aminoethylamino)propyltri-methoxysilane hydrochloride, phenyltriethoxysilane, 3-mercaptopropylmethyldimethoxysilane, 3-glycidoxypropyltri-methoxysilane, bis(2-hydroxyethyl)aminopropyltriethoxysilane, (3-glycidoxypropyl) methyldiethoxysilane, bis-[3-(triethoxysilyl)propyl]tetrasulfide, N-(2-aminoethyl)-3-aminopropylmethyldimethoxysilane, 3-aminopropyltriethoxysilane, allyltrimethoxysilane, vinyltris(methylethylketoximine)silane,di(cumyl)phenyl oxoethylene titanate, di(dioctyl) pysophosphate oxoethylene titanate, dimethacryl, oxoethylene titanate, di(butyl, methyl) pyrophosphato, oxoethylene di(dioctyl) phosphato titanate, di(dioctyl) phosphato, ethylene titanate, di(dioctyl) pyrophosphato ethylene titanate, di(butyl, methyl) pyrophosphato ethylene titanate, 2-(N,N)-dimethylamino)isobutanol adduct of di(dioctyl) pyrophosphate oxoethylene titanate, 2-(N,N-dimethylamino) isobutanol adduct of di(butyl, methyl) pyrophosphato oxoethylene, triethylene adduct of di(octyl) pyrophosphato ethylene titiante, methacrylate functional amine adduct of di(dioctyl) pyrophosphato ethylene titanate, acrylate functional amine adduct of di(dioctyl)pyrophosphato ethylene titanate, methacrylamide functional amine adduct of di(dioctyl) pyroposphato ethylene titanate, acrylate functional amine adduct of di(butyl, methyl) pyrophs ophato oxoethylene, methacryamide adduct of di(dioctyl) pyrophosphato 2,2-dimethylpropylene zirconate, cycloneopentyl cyclo(dimethylamino ethyl) pyrophosphato zirconate, di mesyl salt, and the like.

Useful $R^1$ groups may vary widely. Illustrative of useful $R^1$ groups are monomeric, oligomeric or polymeric hydrocarbons such as alkyl, aryl, alkoxyalkyl, alkynyl, polyethylene glycol, alkenyl, cycloalkyl, cycloalkenyl, alkylaryl, arylalkyl, alkoxyaryl and the like either unsubstituted or substituted with substituents such as alkoxy, alkylthio, cyano, nitro, alkoxycarbonyl, alkylcarbonyl and the like, and fluorinated derivatives thereof.

Useful R groups may vary widely. The only requirement is that the R group is reactive with a polymer component or polymer component in the polymeric matrix. Illustrative of useful R groups are polymers, oligomers or monomers having any number of carbon atoms which are selected from the group consisting of organic radicals which are compatible with at least one polymer forming the composite and which has substituents which are reactive with the polymer or polymer such as nucleophilic or electrophilic moieties which are capable of electrophilic or nucleophilic displacement reactions, coupling reactions, various opening reactions and the like as for example amino, carboxy, acylhalide, acyloxy, hydroxy, phosphato such as di(dioctyl) phosphato, dimethacryl, pyrophosphato such as di(dioctyl) pyrophosphato, isocyanato, ureido, halo, epoxy, epichlorohydrin and the like.

In the preferred embodiments of the invention the organo metallic agents are organo silanes wherein:

$R^1$ is alkyl, cycloalkyl, alkoxyalkyl, phenyl, phenylalkyl, alkoxyphenyl or alkylphenyl;

N is Si;

$X^1$ is alkoxy or alkylamino;

y and x are 0;

o and l are 1;

m is 0, 1, 2, or 3;

n is 1; and

R is an organic radical having at least one functional group which is capable of reacting with one or more polymeric components of the polymeric matrix to form covalent bonds, which radical may optionally include one or more heteroatoms or carbonyl atoms;

In the more preferred embodiments of the invention the silane agents are of the above formula in which:

N is Si;

$X^1$ is alkoxy such as ethoxy, propoxy, isopropoxy, methoxy, butoxy or tert-butoxy;

y and x are 0;

o and l are 1;

m is 0, 1, 2 or 3;

n is 1;

—$R^1$ is alkyl, preferably alkyl of from 1 to about 4 carbon atoms, and more preferred methyl or ethyl, with the proviso that when m is 3, and at least one —$R^1$ is alkyl having at least about 8 carbon atoms, preferably at least about 10 carbon atoms, more preferably at least about 12 carbon atoms and most preferably at least about 14 carbon atoms; and —R is an aromatic or a aliphatic radical of the formula:

$$-R^2-Z^3$$

wherein:

—$R^2$— is a divalent aliphatic chain or aromatic chain which optionally includes one or more divalent heteroatoms or carbonyl groups in the chain; and $Z^3$ is a moiety of the formula:

$$-N(R^3)C(O)N(R^3)_2, -C(R^3)_2-CR^3=C(R^3)_2, -C(R^3)-Ar-C(R^3)=C(R^3)$$

(where as is aromatic such as divalent phenyl or alkylphenylene), —$N(R^3)_2$, $$-S^-M^+, -O^-M^+, -OH, -CR^3\overset{O}{\underset{}{\diagup\diagdown}}C(R^3)_2,$$

$-C(O)X^2, -SH, -S(O)_2-X^2,$

—$NC(O)[C(R^3)_3]_p$, —$S_4H$, —$S_2H$, —$S(O)X^2$

—$C(O)-N(R^3)_2$, —N=C=O, —$C(O)OR^3$, $C(O)OC(O)R^3$ and the like;

p is an integer of from about 3 to about 21;

$X^2$ is Cl, Br, OH or OM;

M is a metal cation such as $Li^+$, $Na^+$ and $K^+$; and $R^3$ is the same or different at each occurrence and is hydrogen or alkyl (preferably alkyl having from 1 to about 10 carbon atoms, more preferably having from 1 to about 6 carbon atoms and most preferably from 1 to about 4 carbon atoms).

In the most preferred embodiments of the invention reactive silane agents are of the above formula in which:

N is Si;

$X^1$ is ethoxy, propoxy, isopropoxy, methoxy, butoxy or tert-butoxy;

y and x are 0;

o and l are 1;

m is 0,1,2 or 3;

n is 1;

—$R^1$ is alkyl, preferably alkyl of from 1 to about 4 carbon atoms, and more preferred methyl or ethyl with the proviso that when m is 3, and at least one —$R^1$ is alkyl having at least about 8 carbon atoms, preferably at least about 10 carbon atoms, more preferably at least about 12 carbon atoms and most preferably at least about 14 carbon atoms;

R is a moiety of the formula:

$$-R^2-Z^3$$

wherein:

—$R^2$— is divalent substituted or unsubstituted alkylene, alkylenephenylene, alkylenephenylenealkylene or a divalent moiety selected from the group consisting of:

$$-(R^4-Z^4)_r- \text{ or } -(R^4-Z^4)_r-R^5-)_r$$

wherein:

$R^4$ is the same or different at each occurrence and is substituted or unsubstituted alkylene or phenylene (preferably where the aliphatic moieties include from 1 to about 10 carbon atoms, more preferably from 1 to about 7 carbon atoms and most preferably from 1 to about 4 carbon atoms) wherein permissible substituents are one or more hydroxy, cyano, or alkoxy or alkyl (preferably having from 1 to about 10 carbon atoms, more preferably having from 1 to about 7 carbon atoms and most preferably having from 1 to about 4 carbon atoms); and r is an integer equal to or greater than 1 (preferably from 1 to about 300;

—$Z^4$— is the same or different at each occurrence and is —O—, —NH—, —C(O)—, —OC(O)—, —N(H)C(O)— or —N(H)C(O)N(H)—;

$Z^3$ is a moiety selected from the group consisting of $-CH_2X^2, -CH=CH_2, -NH_2, -OH,$ $-O-M^+, HC-CH_2, -C(O)X^2, -SH,$ —$S^-M^+$, —$S_2H$, —$S_4H$, —$C(O)NH_2$, —NC(O)—[—$CH_2$]—$_p$, —N=C=O, —NHC(O)-(N-lactam, —NHC(O)-(O-ketoxime) and —NHC(O)-(O-phenol);

$X^2$ is Cl, Br, I, OH or —OM;

$M^+$ is a metal cation such as $Li^+$, $Na^+$ and $K^+$; and p is an integer from about 3 to about 20.

In the embodiments of the invention choice reactive silane agents are of the above formula in which:

N is Si;

$X^1$ is ethoxy, propoxy, isopropoxy, methoxy, butoxy or tert-butoxy;

y and x are 0;

o and l are 1;

m is 0, 1,2 or 3;

n is 1;

—$R^1$ is alkyl, preferably alkyl of from 1 to about 4 carbon atoms, and more preferred methyl or ethyl with the proviso that when m is 3, and at least one —$R^1$ is alkyl having at least about 8 carbon atoms, preferably at least about 10 carbon atoms, more preferably at least about 12 carbon atoms and most preferably at least about 14 carbon atoms;

R is a moiety of the formula:

—$R^2$—$Z^3$ wherein:
—$R^2$— is divalent alkylene; and
$Z^3$ is a moiety selected from the group consisting of

—$CH_2X^2$, —CH=$CH_2$, —$NH_2$, —OH,

—O—$M^+$, HC—$CH_2$, —C(O)$X^2$, —SH,

—$S^-M^+$, —$S_2H$, —$S_4H$, —C(O)$NH_2$, —NC(O)—[—$CH_2$]$_{-p}$, —N=C=O, —NHC(O)-(N-lactam, —NHC(O)-(O-ketoxime) and —NHC(O)-(O-phenol), preferably

—$NH_2$, —OH, —HC—$CH_2$,

—N=C=O, —NHC(O)-(N-lactam, —NHC(O)-(O-ketoxime) and —NHC(O)-(O-phenol);
$X^2$ is Cl, Br, I, OH or —OM;
$M^+$ is a metal cation such as $Li^+$, $Na^+$ and $K^+$; and
p is an integer from about 3 to about 20.

The layers or fibrils may be derivatized with a simple organo metallic compound or with more than one compound. In the preferred embodiments of the invention, the layers or fibrils are derivatized with at least one organo metallic compound and at least one other intercalating compound. Most preferred are those embodiments where at least one organo metallic compound is reactive with the layers or fibrils and with a polymer precursor or a polymer in the polymer matrix and at least one such compound which is non-reactive with such polymers and with the polymer precuursors.

Organo silanes, organo titanates or organo zirconates having reactive substituents are selected for particular classes of matrix polymers based on the reactivity and specifically of the reactive moiety. For example, polyamides are acid terminated and/or amine terminated, and polyesters are acid terminated and/or hydroxy terminated. Therefore, reactive functional groups which react with acid, amine or hydroxy functions to form covalent bonds can be conveniently used with polyesters and polyamides. Specific reactive functions, such as —$NH_2$, —N=C=O, CONH$_2$, —OH, —$O^-M^+$ (where M is a metal cation), —C(O)X (where X is Cl, Br, or I), —C(O)OC(O)$R^3$ and the like may be included in the organo silane, organo titanate or organo zirconate compound to react with reactive functionalities contained in polyesters and polyamide. Similarly, organo silanes, organo titanates and organo zirconates containing functions such as —$NH_2$, —$CH_2$—$X^3$(where $X^3$ is Cl, Br or I), —$CH_2$=$CH_2$,—SH, $S^+M^+$ (where $M^+$ is a metal cation such as $Na^+$, $Li^+$ and $K^+$) and —$S_4H$ can be conveniently reacted with polyolefins and halogenated polyolefins such as poly(ethylene), poly(propylene), poly(chlorotrifluoroethylene) or polyolefin elastomers such as butyl rubber to form covalent bonds between the polyolefin and the reactive organo silane, organo titanate or organo zirconate. Likewise, polyvinyls such as poly(vinyl chloride), poly(co-ethylene vinyl alcohol) and the like can be reacted with organo silanes, organo titanates or organo zirconates containing —$NH_2$, —$CH_2$—$X^3$ (wherein $X^3$ is Cl, Br and I), —OH,

—CH—$CH_2$, —$O^-M^+$ (where M is a metal cation such as $Li^+$, $Na^+$ and $K^+$), and the like.

More preferred reactive organo silanes, organo titanates or organo zirconates are those having substituents that react with thermoplastics and vulcanizable elastomers as described, for example, in the catalog of Huls America, Inc.. These include, organo silanes, organo titanates or organo zirconates having alkoxy, hydroxy, acyloxy, amino, and halo functional groups. Most preferred reactive organo silanes, organo titanates and organo zirconates are those substituted with alkoxy, amino and acyloxy substituents which hydrolyze slowly in water and may be used to treat unintercalated layered or fibrillar material. The reactive organo silanes of choice include caprolactam blocked isocyanatopropyltriethoxysilane and 1-trimethoxysilyl-2-(m,p-chloromethyl)phenylethane. The reactive organo titanates of choice are isopropyl tri(N-ethylene diamino) ethyl titanate and di(octyl) pyrophosphato ethylene titanate aminoethacrylate adduct and reactive organo zirconates of choice are cyclo [dimeopentyl (diallyl)] pyrophosphato dineopentyl (diallyl) zirconate, and cycloneopentyl, cyclo(dimethylamino ethyl) pyrophosphato zirconate and dimesyl salt.

Organo silanes, organo titanates or organo zirconates having compatible substituents are selected for particular classes of matrix polymers based on the compatibility of such substituents and polymers. For example, these substituents include those which form swelling and compatibilizing agents are lipophilic such that the surface tension, at 20° C., of the derivatized particle is preferably less than or equal to about 55 dyne/cm. More preferably, between about 55 and 15 dyne/cm, and preferably between 45 and 20 dyne/cm, as determined by measuring the contact angles made by sessile drops of liquids on the solid surfaces. Such agents will preferably include a lipophilic portion as for example a long chain alkyl, alkenyl or alkylaryl group (preferably of more than about 9 aliphatic carbon atoms). Such agents are well known in the art and include organo metallic compounds having long chain alkyl groups such as octadecyl, dodecyl, decyl, octyl nonyl and the like.

Layered material or fibrillar material may also be derivatized by a single organo silane, organo titanate or organo zirconate or by a mixture of more than one silane, organo titanate and/or organo zirconate or by a mixture of one or more reactive organo silanes, organo titanates and/or organo zirconates with one or more other swelling/compatibilizing agents. Illustrative of such other swelling/compatibilizing agents are reactive or nonreactive onium salts as for example such salts which have moieties which are compatible with the polymer forming the matrix and/or which are reactive with the polymer in the matrix such as those described in more detail in U.S. Pat. No. 4,889,885, EP 0358415; 0398551 and 0352942. Illustrative of such optional onium compounds are compounds of the formula:

$X^{3+}$—$R^6$ where $X^{3+}$ is an ammonium, sulfonium or phosphonium radical and $R^6$ is an organic radical as for example substituted or unsubstituted alkyl, cycloalkenyl, cycloalkyl, aryl, or alkylaryl, either unsubstituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsulfinyl, aryloxy, alkylsulfinyl, alkylsulfonyl, arylthio, arylsulfinyl, alkoxycarbonyl, arylsulfonyl, alkylsilane, and a moiety of the formula:

(—$Z^5CH_2$—$CHR^7$)$_q$—$Z^5$—$R^8$ wherein $R^8$ is alkyl, cycloalkyl, or aryl, or alkyl, cycloalkyl or aryl substututed with a carboxylic acid functional group, $R^7$ is hydrogen, alkyl, or aryl, and $Z^5$ is —O— or —$NR^9$—, where $R^9$ is hydrogen, alkyl, aryl or silylalkyl. Such optional onium salts are preferably the salts of primary and secondary ammonium radicals because of their heat stability. In this way the surface energy of the platelet particles or fibrillar particles and the number of polymer-reactive sites may be varied to optimize platelet particle dispersion, polymer-particle compatibility, and/or polymer-particle bonding.

The second step of the process, the polymer precursor, such as a monomer, is polymerized at a temperature and for a time sufficient to form the desired polymer blend. The method of polymerization of the polymer precursor will vary widely depending on the precursor of choice. Such methods are well known in the art and will not be described herein in great detail. Such well known methods of polymerization include, for example, polymerization by thermal annealing, irradiation (such as γ-ray, x-ray, or ultraviolet radiation), ultrasonic cavitation, or mechanical stress. The reaction is carried out for a time and at a temperature to form the composite of this invention having a polymer of the desired molecular weight as reflected by the melt index of the polymer and having the desired interlayer or interfibril spacing.

The amount of intercalated layered or fibrillar material included in the polymerization mixture may vary widely but generally at least about 0.001% by weight of the composite preferably from about 0.001 to about 60% by weight of the composite, more preferably from about 0.01 to about 20% by weight of the composite and most preferably from about 0.1 to about 10% by weight of the composite. The amount of material employed in any particular situation will depend to a significant extent on the intended use. For example, relatively, larger amounts of platelet particles (exclusive of intercalant since the intercalant content in the layered material may vary), i.e. from about 15% to about 30% by wgt. of the mixture, are used in applications where articles are formed by stamping. Substantially enhanced barrier properties and heat resistance (deflection temperature under load, DTUL) are imparted by platelet particle concentrations greater than about 2.5%. Similarly, substantially enhanced strength is imparted by platelet particle concentrations greater than about 1.5%. When it is desired to preserve such properties as toughness (impact resistance) and elongation which are generally adversely affected by high loadings of any filler material including the nano-scale layered or fibrillar materials of this invention, it is preferred that the silicate loading be less than about 5%. Particle concentration within the range 0.05 to 0.5% significantly enhance modulus, dimensional stability, and wet strength (the latter in the case of polyamides). Concentrations as low as about 0.5% can be employed to increase melt viscosity (useful in film extrusion and in fiber melt spinning) or they may be employed in selected polymers to stabilize a particular crystalline phase (useful in the case of nylon 6 to stabilize the gamma phase) or limit spherulite size which reduces haze and increases optical clarity. In general, the amount of material employed is less than about 60% by weight of the mixture. The amount of material employed is preferably from about 0.01% to about 20% by weight of the mixture, more preferably from about 0.05% to about 10% by weight of the mixture, and most preferably from about 0.05% to about 8% by weight.

A precursor of the polymer forming the polymeric matrix such as a monomer, a mixture of monomers, a prepolymer, a mixture of prepolymers or a mixture containing one or more monomers and one or more prepolymers which can be polymerized in the presence of the derivatized layered or fibrillar material to form the polymeric matrix. As used herein, a "polymer" is a substance composed of ten or more recurring monomeric units which may be the same or different. Preferred polymer precursors are monomers, either alone or in mixtures. The monomers may vary widely depending on the desired polymeric matrix. For example, the monomers may polymerize to form homopolymers or copolymers by various polymerization processes as for example by ionic polymerization or free radical polymerization through condensation, ring opening, and addition reactions.

The polymer precursors may be selected such that the resulting polymer matrix is formed of one or more thermosetting polymers, one or more thermoplastic polymers and combinations of one or more thermosetting polymers and one or more thermoplastic polymers. Illustrative of useful monomers or prepolymers are those which may be polymerized to form thermoplastic polymers or mixtures thereof, and vulcanizable and thermoplastic rubbers. Precursors of thermoplastic resins for use in the practice of this invention may vary widely. Illustrative of useful precursors are those of thermoplastic resins such as polylactones such as poly(pivalolactone), poly(caprolactone) and the like; polyurethanes derived from reaction of diisocyanates such as 1,5-naphthalene diisocyanate, p-phenylene diisocyanate, m-phenylene diisocyanate, 2,4-toluene diisocyanate, 4,4-'diphenylmethane diisocyanate, 3,3'-dimethyl-4,4'-diphenylmethane diisocyanate, 3,3-'dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyanatodiphenylmethane and the like and linear long-chain diols such as poly(tetramethylene adipate), poly(ethylene adipate), poly(1,4-butylene adipate), poly(ethylene succinate), poly(2,3-butylene succinate), polyether diols and the like; polycarbonates such as poly[methane bis(4-phenyl) carbonate], poly[1,1-ether bis(4-phenyl) carbonate], poly[diphenylmethane bis(4-phenyl)carbonate], poly[1,1-cyclohexane bis(4-phenyl)carbonate] and the like; polysulfones; polyether ether ketones; polyamides such as poly (4-amino butyric acid), poly(hexamethylene adipamide), poly(6-aminohexanoic acid), poly(m-xylylene adipamide), poly(p-xylyene sebacamide), poly(2,2,2-trimethyl hexamethylene terephthalamide), poly(metaphenylene isophthalamide) (Nomex), poly(p-phenylene terephthalamide) (Kevlar), and the like; polyesters such as poly(ethylene azelate), poly(ethylene-1,5-naphthalate, poly(1,4-cyclohexane dimethylene terephthalate), poly(ethylene oxybenzoate) (A-Tell), poly-(para-hydroxy benzoate) (Ekonol), poly(1,4-cyclohexylidene dimethylene terephthalate) (Kodel) (as), poly(1,4-cyclohexylidene dimethylene terephthalate) (Kodel) (trans), polyethylene terephthlate, polybutylene terephthalate and the like; poly(arylene oxides) such as poly(2,6-dimethyl-1, 4-phenylene oxide), poly(2,6-diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride, polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated budadiene-styrene copolymers and the like; polyolefins such as low density poly(ethylene), poly(propylene), chlorinated low density poly(ethylene), poly(4-methyl-1-pentene), poly-(ethylene), poly(styrene), and the like; ionomers; poly-(epichlorohydrins); poly(urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicycohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane), poly(dimethyl siloxane co-phenylmethyl siloxane), and the like; protein plastics; and blends of two or more of the foregoing.

Precursors of vulcanizable and thermoplastic rubbers useful in the practice of this invention may also vary widely. Illustrative of such precursors are those of rubbers as for example brominated butyl rubber, chlorinated butyl rubber, polyurethane elastomers, fluoroelastomers, polyester elastomers, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly-(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyester and the like and the elastomeric blocks such as poly(butadiene), poly(isoprene), ethylene-propylene copolymers, ethylene-butylene copolymers, polyether ester and the like as for example the copolymers in poly(styrene)-poly(butadiene)-poly(styrene) block copolymer manufactured by Shell Chemical Company under the trade name of Kraton®.

Illustrative of still other useful polymer precursors are those which may be cured to form thermoset polymers as for example alkyds derived from the esterification of a polybasic acid such as phthalic acid and a polyhydric alcohol such as glycol; allylics such as those produced by polymerization of dialkyl phthalate, dialkyl isophthalate, dialkyl maleate, and dialkyl chlorendate;, amino resins such as those produced by addition reaction between formaldehyde and such compounds as melamine, urea, aniline, ethylene urea, sulfonamide and dicyandiamide; epoxies such as epoxy phenol novlak resins, diglycidyl ethers of bisphenol A and cycloaliphatic epoxies; phenolics such as resins derived from reaction of substituted and unsubstituted phenols such as cresol and phenol with an aldehyde such as formaldehyde and acetaldehyde and phenolic derivatives such as phenolic cyanates and phenolic epoxies; saturated polyesters; silicones; and urethanes formed by reaction of a polyisocyanate such as 2,6-tolylene diisocyanate, 1,6-hexamethylene diiocyanate and 4,4'-dicyclohexylmethane diisocyanate with a polyol such as polyether polyol (trimethylol propane, 1,2, 6-hexanetriol, 2-methyl glycoside, pentaerythitol, poly(1,4-tetramethylene ether) glycol, sorbitol and sucrose), polyester polyols such as those prepared by esterification of adipic acid, phthalic acid and like carboxylic acids with an excess of difunctional alcohols such as ethylene glycol, diethylene glycol, propanediols and butanediols.

Preferred monomers are those which are liquid under reaction conditions and more preferred monomers are those for thermoplastic polymers. Illustrative of these more preferred monomers are lactams which are capable of self polymerization to form nylons such as caprolactam, caprylactam, laurolactam and the like; and diamines which form nylons by reaction with dicarboxylic acids such as hexamethylene 1,6-diamine, decamethylene 1,10-diamine, and the like.

Most preferred monomers are lactams. Lactams are cyclic compounds represented by the formula shown below, which undergo ring-opening polymerization to form polyamides,

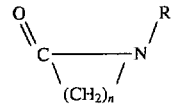

(wherein n is an integer of about 4 to about 12, and R hydrogen, aryl, alkylaryl, alkyl (preferably of 1 to about 8 carbon atoms), or an arylalkyl which may optionally have substituent groups). Illustrative examples include caprolactam (n=6 and R=H in above formula), azacyclootanone (n=7 and R=H in the formula) and dodecanolactam (n=12 and R=H in the formula), which form upon polymerization nylon-6, nylon-8 and nylon-12, respectively. These polymerizable lactams may be used either alone or in combination.

Where required, the polymerization mixture may also include various promoters, activators, catalyst and the like which may be required for polymerization of the monomer of choice. Such promoters, activators, catalyst and the like are well known in the art. Thus, they will not be described herein in any great detail. The mixture may include various optional components which are additives commonly employed with polymers. Such optional components include nucleating agents, fillers, plasticizers, impact modifiers, chain extenders, plasticizers, colorants, mold release lubricants, antistatic agents, pigments, fire retardants, and the like. Alternatively, these optional components may be added to the composition after or completion of or during the polymerization step. These optional components and appropriate amounts are well known to those of skill in the art and, accordingly, will not be described herein in detail.

Upon polymerization of the mixture, at least about 80% by weight, preferably at least about 85% by weight, more preferably at least about 90% by weight and most preferably at least about 95% by weight of the layered or fibrillar particles "uniformly or substantially uniformly dispersed" in the polymer matrix. As used herein "uniformly dispersed" is defined as a degree of dispersion of the platelet or fibrillar particles having a standard deviation in platelet or fibrillar particle density, down to a sampling volume of $10^{-15}m^3$, which is preferably less than about 50% of the mean, more preferably less than about 30% of the mean, and most preferably less than about 20% of the mean as determined from estimates based on transmission electron microscopy.

Platelet particles and fibrillar particles dispersed in matrix polymers have the thickness of the individual layers or the diameter of individual fibrils, or small multiples less than about 10, preferably less than about 5 and more preferably less than about 3 of the layers or fibrols, and still more preferably 1 or 2 layers or fibrils. In the preferred embodiments of this invention, intercalation of every interlayer or interfibril space is complete so that all or substantially all individual layers or fibrils delaminate one from the other to form separate platelet or fibrillar particles. In cases where intercalation is incomplete between some layers or fibrils, those layers or fibrils will not delaminate during polymerization, and will form aggregates of platelet particles or fibrillar particles. These platelet particle or fibril aggregates still constitute nanoscale and nanodispersed fillers and provide enhanced properties over and above those provided by conventional micro-scale fillers, as long as they are less than about 10 layers thick or 10 fibrils in diameter and preferably less than about 5 layers thick or 5 fibrils in diameter.

The dimensions of the fibrils may vary widely. In the preferred embodiments of this invention fibrillar particles have an average diameter or equivalent diameter of from about 20 to about 60 Å with a maximum diameter or equivalent diameter of 200 Å and wherein the length to diameter ratio is at least about 10 to 1. In the more preferred embodiments of the invention, diameter of the fibrillar particles is from about 20 to about 50 Å with a maximum diameter of 80 Å wherein the length to diameter ratio is at least about 50 to 1 and preferably at least about 100 to 1.

The dimensions of the platelet particles may vary greatly. The particle faces may be of any shape such as roughly hexagonal or rectangular shaped. Platelet particle have average diameters between about 10,000 A and about 50 A with a maximum diameter and about 20,000 A, such that the aspect ratio length/thickness ranges from about 2000 to about 10 and an average thickness of less than about 50A with a maximum thickness of 2000 A. For the purposes of the present invention, the average diameter is defined as the diameter of a circle having an area equal to the surface area of one broad surface face of the platelet shaped particle. In the preferred embodiments of the invention, the average thickness of the platelet particles is equal to or less than about 20 A with a maximum diameter of about 10,000 A and the average diameter is between 5,000 A and 100 A. Most preferably the average thickness is about from 5 to about 15A and the average diameter is from about 2,500 to about 150 A with a maximum diameter of about 5,000 A. The most preferred average diameter depends on both the desired property of the nanocomposite and the ease of complete intercalation and delamination to form the nanocomposite structure. High aspect ratios, and therefore large average diameters, are generally preferred for reinforcement and barrier properties, while layered materials having smaller platelets are preferred for their ease of delamination. Thus, for purposes of the nanocomposite properties, the most preferred average diameter is greater than about 150 A, and, for purposes of delamination, it is less than about 3000 A with a maximum diameter of about 5,000 A.

The average interparticle spacing between delaminated layers or fibrils may vary widely depending on the concentration of layered or fibrillar particles. In general the higher the concentration of layered or fibrillar particles in the polymer matrix particle the smaller the interparticle spacing; and conversely, the lower the concentration of layered or fibrillar particles, the larger the interparticle spacing. In general, interparticle spacing is equal to or greater than 15 A. The interparticle spacing is preferably equal to or greater than about 20 A, more preferably equal to or greater than about 30 A and most preferably equal to or greater than about 50 A.

The nanocomposite compositions according to the invention are polymeric materials from which articles of manufacture having valuable properties can be produced by conventional shaping processes, such as melt spinning, casting, vacuum molding, sheet molding, injection molding and extruding. Examples of such articles are components for technical equipment, apparatus castings, household equipment, sports equipment, bottles, containers, components for the electrical and electronics industries, car components, circuits, fibers, semi-finished products which can be shaped by machining and the like. The use of the materials for coating articles by means of powder coating processes is also possible, as is their use as hot-melt adhesives. The compositions according to the invention are outstandingly suitable for specific applications of all types since their spectrum of properties can be modified in the desired direction in manifold ways. Such products of this invention will derive one or more advantages over products molded with polymers having no nanodispersed platelet particles including increased modulus, stiffness, wet strength, dimensional stability, and heat deflection temperature, and decreased moisture absorption, flammability, permeability, and molding cycle time.

The compositions of this invention are especially useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness. In the film, the major plane of the platelet particles or the longitudinal axis of the fibrillar particles is substantially parallel to the major plane of the film. The extent of parallelism of particles and film can be determined by x-ray analysis. x-ray analysis is a useful way to described the crystallinity and orientation of polymer crystals and the orientation of platelet and fibrillar particles. A convenient method of x-ray analysis is that described in Hernans, P. H. and Weidinger A., *Makromol Chemie*, Vol. 44, pp. 24–36 (1961), hereby incorporated by reference.

For the purpose of the present invention Op, the platelet orientation factor, is an indication of the platelet particle or fibrillar orientation in the film. The Op was determined by making azimuthal scans from densitometer tracings of the x-ray photographs which were obtained by exposing the edge of the film to the incident x-rays. The angle is the angle between the reference direction, the normal to the film, and the normal to the plane of interest, the major plane of the platelet particles or the longitudinal axis of the fibrillar particles. The Op values were calculated as the average cosine square ($<\cos^2>$) for the normal to the flat faces of the platelet particles or the longitudinal axis of the fibrillar particles. An Op of 1.0 indicates that the faces of the platelets particles or the longitudinal axis of the fibrillar particles are completely parallel to the plane of the film. An Op of 0.0 indicates that the faces of the platelets particles or the longitudinal axis of the fibrillar particles perpendicular to the plane of the film. The Op of the platelet particles or the longitudinal axis of the fibrillar particles in the film of the present invention is preferably from about 0.70 to about 1.0, more preferably from about 0.90 to about 1.0 and most preferably from about 0.95 to about 1.0. Such preferred orientation of platelet particles or the longitudinal axis of the fibrillar particles results in enhanced barrier properties and increased tare strength.

The homogeneously distributed platelet or fibrillar particles and polymer are formed into a film by suitable film-forming methods. Typically, the composition is melted and forced through a film forming die. The die can be a flat die or a circular die. A typical flat die is a hanger shaped die, and a typical circular die is a tubular film die.

The film of the nanocomposite of the present invention may go through steps to cause the platelet or fibrillar particles to be further oriented so the major planes through the platelet or fibrillar particles are substantially parallel to the major plane through the film. A method to do this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die.

The films of this invention may exhibit one or more of the following benefits: increased modulus, wet strength, and dimensional stability, and decreased moisture adsorption and permeability to gases such as oxygen and liquids such as water, alcohols and other solvents. The films are therefore useful in those applications where such properties are of benefit as for example, food packaging.

The following specific examples are presented to more particularly illustrate the invention and are not to be construed as limitations thereon.

EXAMPLE 1

Montmorillonite treated with a nylon-reactive silane, was prepared by 1. obtaining a water-stable alkoxysilane, caprolactam-blocked isocyanatopropyl(triethoxy)silane, and 2. combining an aqueous or alcoholic solution of the alkoxysilane with an aqueous slurry of montmorillonite in a ratio of 70 to 110 mmole of alkoxysilane to 100 g montmorillonite.

Caprolactam-blocked isocyanatopropyl(triethoxy)silane was prepared by mixing 24.7 g isocyanatopropyl(triethoxy)silane (0.1 mole; obtained from Huls America, Inc.) with 11.3 g epsilon-caprolactam (0.1 mole; obtained from Aldrich, Inc.) under a flow of nitrogen and heating the mixture to 110° C. for 2 h. The unpurified silane exhibited the following proton NMR spectrum (chemical shift (ppm), multiplicity, relative number of protons): 9.3, triplet, 1H; 3.99, triplet, 2H; 3.82, quartet, 6H; 3.28, quartet, 2H; 2.71, triplet, 2H; 1.6, multiplet, 8H; 1.22, triplet, 9H; 0.63, triplet, 2H.

Silane-treated montmorillonite was prepared by adding 32.5 g caprolactam-blocked isocyanatopropyl(triethoxy)silane (0.09 mole), dissolved in 300 mL of a water-ethanol mixture (2:1), to a stirred slurry of 100 g montmorillonite in 5 L water at a temperature of about 60° C. The mixture thickened after the addition of about one half of the silane solution, and fully flocculated by the time the addition was completed. The silane-treated montmorillonite was collected in a filter, washed 2 times with fresh water, and dried in a fluid bed drier at 110° C. for 4 h. The dried product was reduced to 200 mesh particles either by tumbling with grinding media or by jet milling.

EXAMPLE 2

A nylon 6/montmorillonite composite, comprising 2% montmorillonite treated with a nylon-reactive silane was prepared by 1. combining 1200 g caprolactam, 60 g aminocaproic acid, and 32 g montmorillonite treated with caprolactam-blocked isocyanatopropylsilane, and 2. and heating the mixture at about 255° C. until the caprolactam plus aminocaproic acid polymerized, about 4 h.

The dry ingredients were tumbled together with grinding media for 1 h and transferred to a 2 L resin kettle purged with a constant flow of nitrogen. The kettle was heated to 110° C. and the mixture stirred with an anchor paddle for 2 to16 h. The temperature of the kettle was elevated until the temperature of the mixture reached about 255° C. for 2.5 to 6 h. The crude composite was ground and washed in boiling water 3 times for 1.5 h each to remove water soluble monomer and oligomers.

EXAMPLE 3

A nylon 6/montmorillonite composite, comprising about 2% montmorillonite treated with a mixture of nylon-reactive silane and non-reactive silane, was prepared, processed, and evaluated according to the procedure described in Example 2 except that the montmorillonite was treated with octadecylsilane and caprolactam-blocked isocyanatopropylsilane in a 10 to 1 molar ratio. The mixed silane-treated montmorillonite was prepared according to the procedure described in Example 1 except that, after the addition of 3.3 g of caprolactam-blocked isocyanatopropyl(triethoxy)silane (9 mmole per 100 g montmorillonite), 81 mmole of an octadecyl(alkoxy)silane (dissolved in a mixture of diacetone and t-butanol; 1:1; obtained from Huls America, Inc under the trade name Glassclad®) was added to the montmorillonite slurry.

EXAMPLE 4

A nylon 6/montmorillonite composite, comprising about 2% montmorillonite treated with a mixture of nylon-reactive silane and non-reactive silane, was prepared, processed, and evaluated according to the procedure described in Example 3 except that the montmorillonite was treated with octadecylsilane and chloromethylphenylethylsilane in a 10 to 1 molar ratio. The mixed silane-treated montmorillonite was prepared according to the procedure described in Example 3 except that 2.8 g of 1-trimethoxysilyl-2-(m,p-chloromethyl)phenylethane (9 mmole per 100 g montmorillonite) was added to the slurry prior to the addition of 81 mmole of the octadecyl(alkoxy)silane.

EXAMPLE 5

A nylon 6/montmorillonite composite, comprising about 2% montmorillonite treated with a non-reactive silane, was prepared, processed, and evaluated according to the procedure described in Example 3 except that the montmorillonite was treated with octadecylsilane. The silane-treated montmorillonite was prepared according to the procedure described in Example 3 except that 90 mmole of the octadecyl(alkoxy)silane was added to the slurry.

COMPARATIVE EXAMPLE 1

A nylon 6/montmorillonite composite, comprising about 2% montmorillonite treated with a nylon-reactive ammonium ion, was prepared, processed, and evaluated according to the procedure described in Example 2 except that the montmorillonite was treated with protonated 11-aminoundecanoic acid. The ammonium-ion-treated montmorillonite was prepared according to the procedure described in Example 3 except that 24 g of 11-aminoundecanoic acid hydrochloride (90 mmole per 100 g montmorillonite) was added to the slurry.

COMPARATIVE EXAMPLE 2

Untilled nylon 6 was prepared according to the procedure described in Example 2 except that no montmorillonite was added to the polymerization mixture.

COMPARATIVE EXAMPLE 3

A series of experiments were carried out to evaluate certain properties of molded parts and films formed from the composites of this invention and to compare same to comparable properties of molded parts and films formed from other composites. Properties selected for evaluation were tensile and notch impact at 50% relative humidity and after 45 days in water and water vapor transmission.

Tensile and notched impact tests on injection molded parts of the composite were performed according to the procedures of ASTM D638 and D256. Composite samples were dried at 85° C. for 16 hrs. in vacuum and were injection molded into ⅛" thick test specimens which were evaluated in the ASTM procedures.

Water vapor transmission rate measurements were performed on 2 mil thick compression molded films of the composite according to the procedures of ASTM D3985. The average tensile and notched impact value and composite are set forth in Tables I and II, and the average transmission value and composite are set forth in Table III.

TABLE I

Nylon 6-Montmorillonite (2% Montmorillonite w/w) Composites Prepared by Polymerizing Caprolactam with Treated Montmorillonite, at 50% relative humidity.

| COMPOSITE | TREATMENT OF MONTMORILLONITE | TENSILE MODULUS, KSI (MPA) | NOTCHED IMPACT, FT-LB/IN |
|---|---|---|---|
| Com. Ex. 2 | unfilled nylon 6 | 360 (2,200) | 0.9 |
| Com. Ex. 1 | 11-aminoundecanoic acid ion | 450 (3,100) | 0.7 |
| Ex. 5 | octadecylsilane | 435 (3,000) | 1.3 |
| Ex. 2 | caprolactam-blocked isocyanatopropylsilane | 570 (3,900) | 0.9 |
| Ex. 4 | octadecylsilane + chloromethylphenylethyl-silane (10:1) | 480 (3,300) | 1.3 |
| Ex. 3 | octadecylsilane + caprolactam-blocked isocyanatopropylsilane (10:1) | 450 (3,100) | 1.6 |

TABLE II

Nylon 6-Montmorillonite (2% Montmorillonite w/w) Composites Prepared by Polymerizing Caprolactam with Treated Montmorillonite, after 45 days in water.

| COMPOSITE | TREATMENT OF MONTMORILLONITE | TENSILE MODULUS, KSI (MPA) | NOTCHED IMPACT, FT-LB/IN |
|---|---|---|---|
| Comp. Ex. 2 | unfilled nylon 6 | 55 (380) | no break |
| Comp. Ex. 1 | 11-aminoundecanoic acid ion | 130 (930) | 3.5 |
| Ex. 4 | octadecylsilane + chloromethylphenylethyl-silane (10:1) | 150 (1,000) | 5.4 |
| Ex. 3 | octadecylsilane + caprolactam-blocked isocyanatopropylsilane (10:1) | 130 (930) | no break |

TABLE III

Nylon 6-Montmorillonite (2% Montmorillonite w/w) Composites Prepared by Polymerizing Caprolactam with Treated Montmorillonite, water vapor transmission rate through 2 mil compression molded films.

| COMPOSITE EX. 2 | TREATMENT OF MONTMORILLONITE | WATER VAPOR TRANSMISSION RATE, G+ MIL/ 100 IN$^2$/DAY |
|---|---|---|
| Comp. Ex. 2 | unfilled nylon 6 | 20 |
| Comp. Ex. 1 | 11-aminoundecanoic acid ion | 7.3 |
| Ex. 5 | octadecylsilane | 6.2 |
| Ex. 3 | octadecylsilane + caprolactam-blocked isocyanatopropylsilane (10:1) | 6.0 |

COMPARATIVE EXAMPLE 4

A nylon 6— montmorillonite nanocomposite, comprising 2% montmorillonite, is formed by polymerizing nylon 6 monomer in the presence of the reaction products of an alkoxysilylisocyanate and an organoclay.

A mixture of 2,000 g of caprolactam, 100 g of aminocaproic acid, and 1.0 g of triethoxysilylpropylisocyanate is stirred at 100 rpm at 110° C. in a resin kettle using an anchor stirrer under a flow of nitrogen. After 30 min, 55 g of montmorillonite intercalated with octadecylammonium ion (95 mmole per 100 g montmorillonite) is added. After 2 h of stirring at 110° C., the mixture is heated to 255° C. for 4 h. The crude product is cooled, ground, washed 3 times in boiling water for 1.5 h each time, and dried at 95° C. in a vacuum oven.

Injection molded test specimens exhibit mechanical and barrier properties similar to those exhibited by the nanocomposite of Example 4.

What is claimed is:

1. A composite material comprising a polymer matrix comprising a polymer, said matrix having layered or fibrillar particles uniformly dispersed therein, wherein the interlayer or interfibril distances is equal to or greater than about 50 A, the average thickness of said platelet particles is equal to or less than about 50 A where the maximum thickness is equal to or less than about 100 A and the average diameter of said fibrils is equal to or less than about 100 A where the maximum diameter is equal to or less than about 200 A, wherein the length to diameter ratio of said fibril is equal to or greater than about 10 to about 1, said particles having organo metallic species bonded thereto, said bonded species selected from the group consisting of organo silanes, organo titanates, and organo zirconates and having one or more moieties bonded to at least one polymer in said polymer matrix, or said bonded species having one or more moieties which promote intermingling with at least one polymer in said polymer matrix or a combination of said species.

2. Composite material of claim 1 wherein said particles are layered particles.

3. Composite material of claim 2 wherein said layered particles are derived from phyllosilicates.

4. Composite material of claim 3 wherein said phyllosilicates have from about 0.2 to about 0.9 basic charges per formula unit.

5. Composite material of claim 4 wherein said phyllosilicates are smectites clay minerals.

6. Composite material of claim 5 wherein said smectites are selected from the group consisting of montmorilonite, nontronite, beidellite, volkonskoite, hectorite, saponite, sauconite, magadiite and kenyaite.

7. Composite material of claim 6 wherein said smectites are montmorillonite or hectorite.

8. Composite of claim 3 wherein said organo metallic species is selected from the group consisting of species of the formula:

$$(—)_n N[(Z^2)_y(R^1)_o]_m[(Z^1)_x(R)_y)]_{4-n-m}$$

wherein:

(—) is a covalent bond to the surface of the layer or fibril;

N is Si, Zr or Ti;

$Z^1$ and $Z^2$ are the same or different and are —O—, —OC(O)—, —OC(O)O—, —OP(O)(O—)$_2$, —OP(O)(OH)P(O)(O—)$_2$ or, —OS(O)$_2$—, or any two $Z^1$ or $Z^2$ or any $Z^1$ and $Z^2$ together form a divalent chain forming cyclic structure;

l and o are the same or different and are 1 or 2;

x and y are the same or different and are 0 or 1 with the proviso that when N is Si, x and y are 0 and when N is Ti or Zr, x and y are 1;

m and n are the same or different and are 0, 1, 2 or 3, with the proviso that the sum of m and n is equal to 4 or less;

$R^1$ is the same or different at each occurrence and is a nonhydrolyzable organic radicals which are bonded to the N atom and not displaceable during the formation of the composite and is compatible with said polymer; and R are the same or different at each occurrence and are organic radicals which are bonded to the N atom, and which are not hydrolyzable and displaceable during the formation of the composite, and which is reactive with the polymer matrix or said polymer of the polymer matrix or with the polymer precursor to form covalent bonds between the reaction residue of R and the polymer or polymer precursor.

9. Composite material of claim 8 wherein:

$R^1$ is alkyl, cycloalkyl, alkoxyalkyl, phenyl, phenylalkyl, alkoxyphenyl or alkylphenyl;

N is Si;

y and x are 0;

o and l are 1;

m is 0, 1, 2, or 3;

n is 1; and

R is an organic radical having at least one functional group which is capable of reacting with one or more polymeric components of the polymeric matrix to form covalent bonds, which radical may optionally include one or more heteroatoms or carbonyl atoms.

10. Composite material of claim 8 wherein:

N is Si;

y and x are 0;

o and l are 1;

m is 0, 1, 2 or 3;

n is 1;

—$R^1$ is alkyl, with the proviso that when m is 3 at least one —$R^1$ is alkyl having at least about 8 carbon atoms; and —R is an aromatic or a aliphatic radical of the formula:

$$—R^2—Z^3$$

wherein:

—$R^2$— is a divalent aliphatic chain or aromatic chain which optionally includes one or more divalent heteroatoms or carbonyl groups in the chain; and $Z^3$ is a moiety of the formula:

$$—N(R^3)C(O)N(R^3)_2, —C(R^3)_2—CR^3=C(R^3)_2, —C(R^3)—Ar—C(R^3)=C(R^3)$$

(where Ar is aromatic) or $NHR^3$, —$S^-M^+$, —$O^-M^+$, —OH, —(cyclo-$OCR^3$—$C(R^3)_2$), —$C(O)X^2$, —SH, —$S(O)_2$—$X^2$, —$NR^3C(O)[C(R^3)_2]_p$, —$S_4H$, —$S_2H$, —$S(O)X^2$ —$C(O)$—$N(R^3)_2$, —N=C=O, —$C(O)OR^3$, or $C(O)O-C(O)R^3$;

p is an integer of from about 3 to about 21;

$X^2$ is Cl, Br, OH or OM;

M is a metal cation; and $R^3$ is the same or different at each occurrence and is the hydrogen or alkyl.

11. Composite material of claim 10 wherein:

N is Si;

y and x are 0;

o and l are 1;

m is 0, 1, 2 or 3;

n is 1;

—$R^1$ is alkyl of from 1 to about 4 carbon atoms, with the proviso that when m is 3 at least one —$R^1$ is alkyl having at least about 8 carbon atoms; and —R is an aromatic or a aliphatic radical of the formula:

$$—R^2—Z^3$$

wherein:

—$R^2$— is a divalent aliphatic chain or aromatic chain which optionally includes one or more divalent heteroatoms or carbonyl groups in the chain; and $Z^3$ is a moiety of the formula:

$$—CH_2—CH=CH_2, —NH_2, —(cyclo-O-HC-CH_2—),$$

—$N(R^3)C(O)N(R^3)_2$, —$C(R^3)_2$—$CR^3=C(R^3)_2$, —$C(R^3)$—Ar—$C(R^3)=C(R^3)$ (where Ar is aromatic or $NHR^3$, —$S^-M^+$, —$O^-M^+$, —OH, (cyclo-O-$CR^3C(R^3)_2$, —$C(O)X^2$, —SH, —$S(O)_2$—$X^2$, —$NC(O)[C(R^3)_3]_p$, —$S_4H$, —$S_2H$, —$S(O)X^2$ —$C(O)$—$N(R^3)_2$, —N=C=O, —$C(O)OR^3$, or $C(O)C(O)R^3$;

p is an integer of from about 3 to about 21;

$X^2$ is Cl, Br, OH or OM;

M is a metal cation; and $R^3$ is the same or different at each occurrence and is the hydrogen or alkyl.

12. Composite material of claim 11 wherein:

N is Si;

y and x are 0;

o and l are 1;

m is 0, 1,2 or 3;

n is 1;

—$R^1$ is alkyl, with the proviso that when m is 3 at least one —$R^1$ is alkyl having at least about 10 carbon atoms;

R is a moiety of the formula:

$$—R^2—Z^3$$

wherein:

—R² — is divalent substituted or unsubstituted alkylene or a divalent moiety selected from the group consisting of:

—(R⁴—Z⁴),— and —(R⁴—Z⁴),—R⁵—), wherein:

R⁴ is the same or different at each occurrence and is substituted or unsubstituted divalent alkylene having from 1 to about 4 carbon atoms or phenylene wherein permissible substituents are one or more hydroxy, cyano, or alkoxy or alkyl having from 1 to about 4 carbon atoms; and r is an integer equal to or greater than 1;

—Z⁴— is the same or different at each occurrence and is —O—, —NH—, —C(O)—, —OC(O)—, —N(H)C(O)— or —N(H)C(O)N(H)—;

Z³ is a moiety selected from the group consisting of —CH₂X², —CH=CH₂, —NH₂, —OH, —O—M⁺, HC—CH₂, —C(O)X₂, —SH, —S⁻M⁺, —S₂H, —S₄H, —C(O)NH₂, —NHC(O)—[—CH₂]—ₚ, —N=C=O, —NHC(O)-(N-lactam, —NHC(O)-(O-ketoxime) and —NHC(O)-(O-phenol);

X² is Cl, Br, I, OH or —OM;

M⁺ is a metal cation comprising; and p is an integer from about 3 to about 20.

13. Composite material of claim 12 wherein:

N is Si;

y and x are 0;

o and l are 1;

m is 0,1,2 or 3;

n is 1;

—R¹ methyl or ethyl, with the proviso that when m is 3 at least one —R¹ is alkyl having at least about 12 carbon atoms;

R is a moiety of the formula:

—R²—Z³ wherein:

—R²— is divalent alkylene; and

Z³ is a moiety selected from the group consisting —NH₂, —OH, —(cyclo-O-HC-CH₂), —N=C=O, —NHC(O)-(N-lactam, —NHC(O)-(O-ketoxime) and —NHC(O)-(O-phenol).

14. Composite material of claim 1 wherein said polymeric matrix comprises a polyamide, a polyester, a halogenated polyolefin, a polycarbonate, a polyurethane, a polyether, a polyolefin, a polyvinyl, a polyamide or a combination thereof.

15. Composite of claim 14 wherein said polyester is poly (ethylene terephthalate), poly(butylene terephthalate) or poly(ethylene naphthalate).

16. Composite material of claim 14 wherein said polyolefin and halogenated polyolefin are selected from the group consisting of polyethylene, polypropylene, poly(m-ethyl pentene), a polyolefin elastomer and poly(chlorotrifluoroethylene).

17. Composite material of claim 14 wherein said polyvinyl is poly(co-ethylene-vinylalcohol), or polyvinyl chloride.

18. Composite material of claim 14 wherein said polyamide is nylon-6, nylon 6,6 or nylon -12.

19. Composite material of claim 1 wherein said particles is less than about 50 A thick.

20. Composite material of claim 19 wherein said particles is less than about 20 A in thickness.

21. Composite material of claim 20, wherein the thickness of said particles is about 5 to about 20 A thick.

22. Composite material of claim 19 wherein the average interparticle spacing between particles is greater than about 15 A.

23. Composite material of claim 22, wherein the average interparticle spacing between particles is greater than about 200 A.

24. Composite material of claim 1 wherein the amount of said particles in said material is equal to or greater than about 0.001% by weight of the material.

25. Composite material of claim 24 wherein said amount is from 0.001 to about 60% by weight of the material.

26. Composite material of claim 25 wherein said amount is from about 0.01 to about 20% by weight of the material.

27. Composite material of claim 26 wherein said amount is from about 0.1 to about 10% by weight of the material.

28. An article of manufacture comprising a body, said body fabricated, totally or in part, from a composite material comprising a polymer matrix comprising a polymer, said matrix having layered or fibrillar particles uniformly dispersed therein, wherein the interlayer or interfibril distances is equal to or greater than about 50 A, the average thickness of said platelet particles is equal to or less than about 50 A where the maximum thickness is equal to or less than about 100 A and the average diameter of said fibrils is equal to or less than about 100 A where the maximum diameter is equal to or less than about 200 A, wheren the length to diameter ratio of said fibril is equal to or greater than about 10 to about 1, said particles having organo metallic species bonded thereto, said bonded species selected from the group consisting of organo silanes, organo titanates, and organo zirconates and having one or more moieties bonded to at least one polymer in said polymer matrix, or said species having one or more moieties which promote intermingling with at least one polymer in said polymer matrix or a combination of said species.

29. A process for forming a polymeric composite which comprises layered or fibrillar particles dispersed in a polymeric matrix which comprises:

forming a reaction mixture of an inorganic meterial comprising layered or fibrillar particles and an organo metallic species selected from the group consisting of organo silanes, organo titanates and organo zirconates, said species having one or more moieties which are capable of forming covalent bonds with said particles and said species having one or more moieties which are reactive with a polymer precursor or said species having one or more moieties which promote intermingling with a polymer formed by polymerization of said polymer precursor or a combination of said species to form a swellable and polymer compatible intercalated material comprising said species arrayed between said layers or fibrils with increased interlayer or interfibril spacing having a first residue of said organo metallic species covalently bonded to a surface of all or a portion of said particles; and polymerizing said polymer precursor in the presence of said swellable and polymer compatible intercalated material to form a composite having said particles uniformly dispersed in a polymeric matrix comprising said polymer, wherein the interlayer or interfibril distances is equal to or greater than about 50 A, the average thickness of said platelet particles is equal to or less than about 50 A where the maximum thickness is equal to or less than about 100 A and the average diameter of said fibrils is equal to or less than about 100 A where the maximum diameter is equal to or less than about 200 A, wheren the length to diameter ratio of said fibril is equal to or greater than about 10 to about 1, said particles having organo metallic species bonded thereto said bonded species having one or more moieties bonded to at least one polymer in said polymer matrix, or said species having one or more moieties which are comparable with at least one polymer in said polymer matrix which project away from the particle surface and which are not bonded to said polymer or a combination of said species.

30. A process according to claim 29 which comprises the steps of:

(a) forming a reaction mixture comprising a polymer precursor and a swellable and polymer compatible intercalated material comprising layered or fibrillar particles having an organo metallic species selected from the group consisting of organo silanes, organo titanates and organo zirconates covalently bonded to their surfaces, said species having one or more moieties which are reactive with said polymer precursor or said species having one or more moieties which promote intermingling with a polymer formed by polymerization of said polymer precursor or a combination of said species said species being reactive with said polymer precursorf; and (b) polymerizing said polymer precursor in the presence of said swellable and polymer compatible interelated material to form a composite having said particles uniformly dispersed in a polymeric matrix comprising said polymer, wherein the interlayer or interfibril distances is equal to or greater than about 50 A, the average thickness of said platelet particles is equal to or less than about 50 A where the maximum thickness is equal to or less than about 100 A and the average diameter of said fibrils is equal to or less than about 100 A where the maximum diameter is equal to or less than about 200 A, wherein the length to diameter ratio of said fibril is equal to or greater than about 10 to about 1, said particles having organo metallic species bonded thereto said bonded species having one or more moieties bonded to at least one polymer in said polymer matrix, or said species having one or more moieties which are compatible with at least one polymer in said polymer matrix which project away from the particle surface and which are not bonded to said polymer or a combination of said species.

31. A process according to claim 30 which comprises the steps of:

(a) forming a reaction mixture comprising a polymer precursor, a swellable comprising layered or fibrillar particles and an organo metallic species selected from the group consisting of organo silanes, organo titanates and organo zirconates, said species having one or more moieties which are capable of forming covalent bonds with said particles and said species having one or more moieties which are reactive with a polymer precursor or said species having one or more moieties which promote intermingling with a polymer formed by polymerization of said polymer precursor or a combination of said species to form a swellable and polymer compatible intercalated material having a first residue of said organo metallic species covalently bonded to a surface of all or a portion of said particles; and (b) polymerizing said polymer precursor in said mixture to form a composite having said particles uniformly dispersed in a polymeric matrix comprising said polymer, wherein the interlayer or interfibril distances is equal to or greater than about 50 A, the average thickness of said platelet particles is equal to or less than about 50 A where the maximum thickness is equal to or less than about 100 A and the average diameter of said fibrils is equal to or less than about 100 A where the maximum diameter is equal to or less than about 200 A, wheren the length to diameter ratio of said fibril is equal to or greater than about 10 to about 1, said particles having organo metallic species bonded thereto said bonded species having one or more moieties bonded to at least one polymer in said polymer matrix, or said species having one or more moieties which are compatible with at least one polymer in said polymer matrix which project away from the particle surface and which are not bonded to said polymer or a combination of said species.

* * * * *